United States Patent Office 3,496,525
Patented Feb. 17, 1970

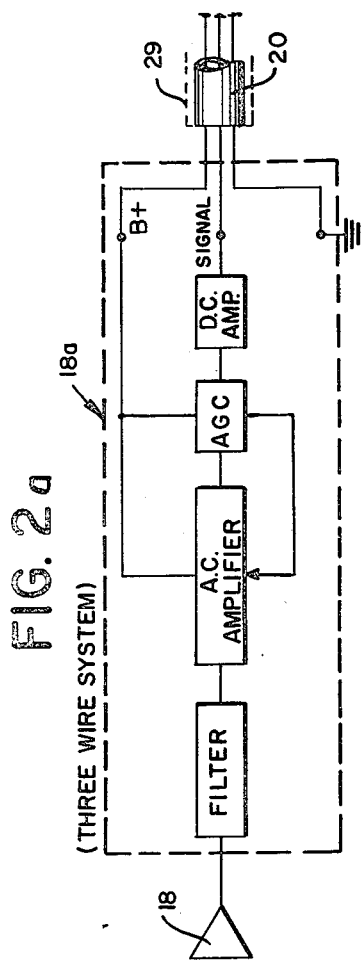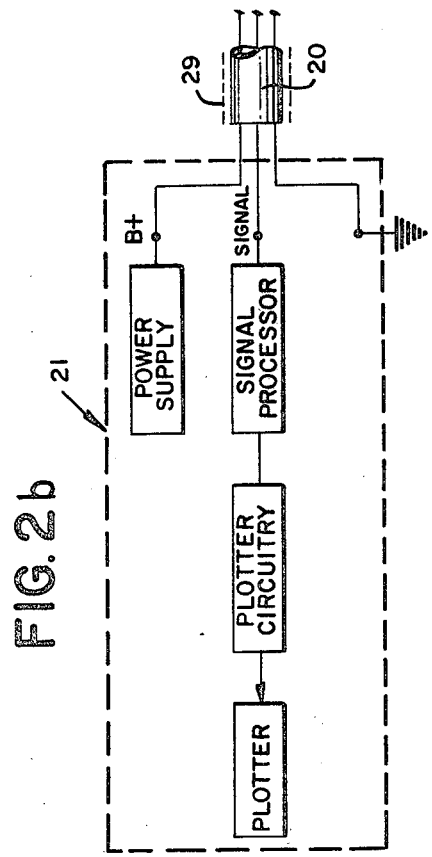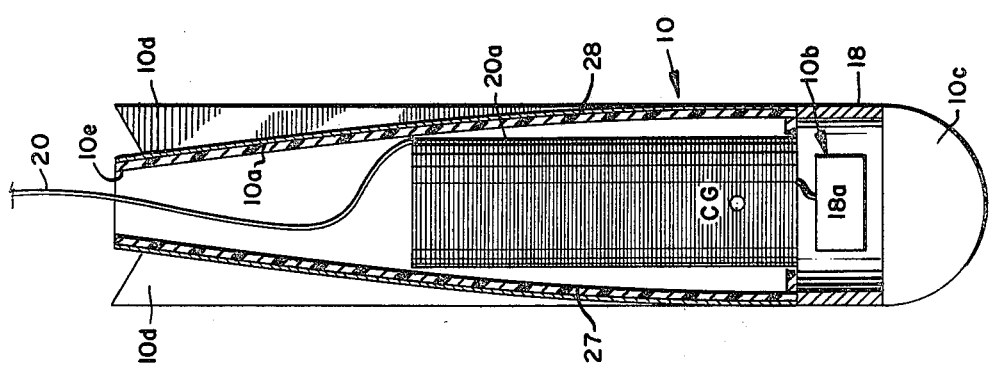

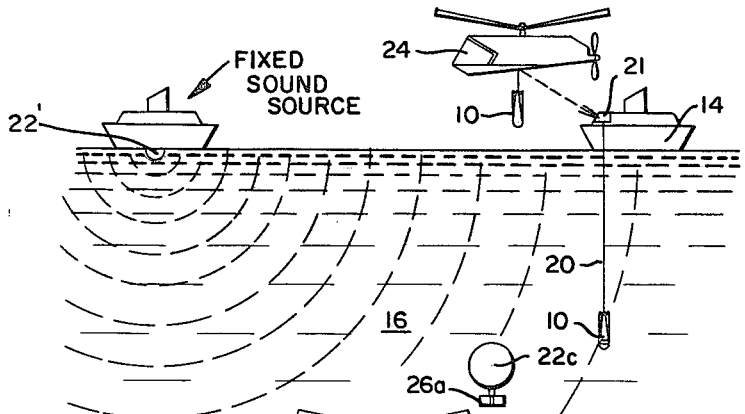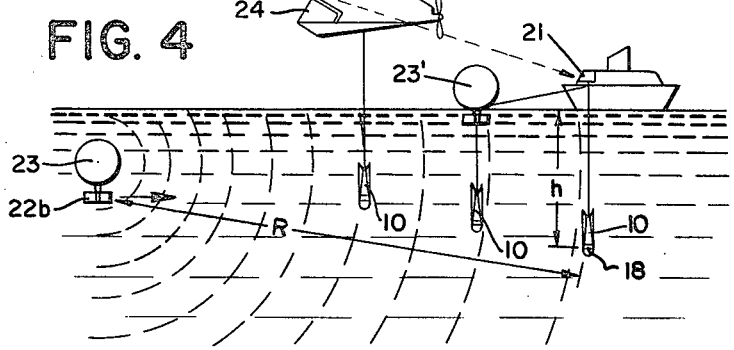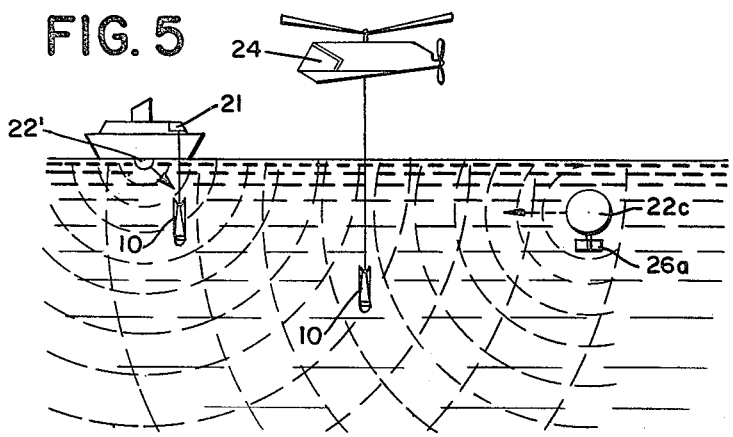

3,496,525
EXPENDABLE TRANSMISSION LOSS HYDROPHONE SYSTEM
Samuel A. Francis, Marion, Mass., assignor to Buzzards Corp., Marion, Mass., a corporation of Massachusetts
Continuation-in-part of application Ser. No. 610,543, Jan. 20, 1967. This application May 29, 1968, Ser. No. 733,045
Int. Cl. H04b 13/00; G01s 1/72
U.S. Cl. 340—5          8 Claims

ABSTRACT OF THE DISCLOSURE

An expendable hydrophone probe is dropped into the ocean and as it sinks it receives signals from a fixed sound source. The sound signals are converted by the probe to electric signals and transmitted by wire to a signal processor aboard a vessel where the signals are plotted as a function of depth of the probe and location of the sound source to determine the transmission loss.

CROSS REFERENCES

This application is a continuation-in-part of application Ser. No. 610,543, filed Jan. 20, 1967, entitled "Expendable Transmission Loss Hydrophone System" and now abandoned.

BACKGROUND OF THE INVENTION

Field of the invention

The present invention relates in general to sound propagation measurement in the sea and, in particular, to a sound transmission loss measuring method and system which does not require knowledge of the temperature variations in the ocean or body of water, the state of the sea or the use of range tables.

Description of the prior art

Anti-submarine warfare sonar can be used most effectively when the target detection range can be accurately estimated. Present tactical methods for predicting sonar target detection range rely on real time measurement of the vertical temperature variations or profile in the ocean at the position of the ship from which measurements are made. This data is used to obtain detection range by the use of range tables based on ray theory computations and experimental data. The accuracy obtainable is limited ±33% of range 50% of the time, with a greater error the remainder of the time), and depends on many factors which are difficult to predict or measure.

SUMMARY OF THE INVENTION

The present invention utilizes a different approach, namely the direct measurement of sonar transmission loss in the ocean, in real time at the location of the ship from which measurements are made. This system has not previously been implemented, and the particular system outlined below is basically different from other direct measurement methods proposed.

The present system consists of expendable hydrophone probes linked by multiwire cable to a plotter aboard a seaborne or airborne vessel. The acoustic signal intensity is measured by the expendable hydrophone probes, which are dropped at predetermined distances from the sound source and descend at a predicted rate in the water. The fixed sound source could be a ship's sonar transmitter or a separate sound transmitter or reflector attached to a buoy and dropped into the ocean to operate at sonar depth. The expendable hydrophone probes may be launched by the same ship, another ship, or even a helicopter. The acoustic signal is converted by the hydrophone probe to an electric signal, processed by an electronic module within the probe, and transmitted by a hard-wire link to an indicator aboard the vessel.

BRIEF DESCRIPTION OF THE DRAWINGS

In order that the present invention may be readily carried into effect, it will now be described with reference to the accompanying drawings, wherein:

FIG. 1 is a cross-sectional view of an embodiment of an expendable hydrophone probe which may be utilized in the system of the present invention;

FIG. 2a is a block diagram of an embodiment of the electronic module within the probe of FIG. 1;

FIG. 2b is a block diagram of an embodiment of the electric indication means aboard the searching vessel;

FIG. 3 is a schematic diagram of one variation of the system of the present invention for measuring sound shadow zones by means of two ships;

FIG. 4 is a schematic diagram of the system of the present invention for measuring sound transmission loss by means of a single ship; and FIG. 5 is another variation of the system of FIG. 4 utilizing a passive target (reflector).

DESCRIPTION OF THE PREFERRED EMBODIMENTS

The transmission loss hydrophone system consists of a stationary sound source 22, expendable hydrophone probes 10 and shipboard recording gear 21 (FIG. 4). The shipboard sonar equipment 22' may or may not play a role in the transmission loss hydrophone system, depending on the approach that is used. The basic idea is to have an acoustic signal emitted or reflected from a source such as an expendable target which is dropped by the ship from which measurements are made on other platform and remains stationary in the water as the ship moves away from it. The ship then launches one or more expendable hydrophones 10 (FIGS. 4 and 5) which free fall at a predicted rate through the ocean. These are launched at any desired range (or distance) from the target, and receive the acoustic signal from the sound source.

The acoustic signal is converted by the hydrophone 18 (FIG. 2a) to an electric signal which is transmitted by a hard wire link 20 (FIGS. 2a and 2b) to the shipboard indication equipment 21 (FIG. 2b). Thus, acoustic signal intensity is recorded over the depth through which the sinking hydrophone is capable of recording, and at each range for which an expendable hydrophone is launched. Since the acoustic signal intensity emitted or reflected by the target will be known, the received signal intensity allows a direct calculation of transmission loss, L, versus depth, $h$, at each hydrophone launching range, R. It is within the scope of the present invention for the signal to originate from a source other than an expendable target, such as another ship or vehicle.

The direct measurement approach does not require knowledge of the temperature variations or profile in the ocean, sea state, or the use of range tables. The horizontal variability of the ocean and all the other factors which make accurate range prediction difficult are bypassed when the transmission loss between target and hydrophone is directly measured. With some embodiments of this system, sonar efficiency is also measured, and the only unknown quantities are sonar operator efficiency and submarine aspect (or target strength).

The various ways in which the transmission loss hydrophone system can be implemented are outlined as follows:

(1) Active sound source (a) *Pinger* (FIG. 4).—In this case the active sound transmitter is dropped by the ship from which measurements are made or by another ship, helicopter or airplane, and emits an acoustic signal of known frequency and intensity.

(b) *Other ship's sonar* (FIG. 3).—The signal may originate from another ship, and correct beam shape and geometric spreading is obtained. In this case it is the other ship's sonar efficiency which is included, while the ship from which measurements are made measures the signal strength vs. depth at several ranges.

(2) Passive sound source (FIG. 5)

(a) *Reflector*.—An acoustic reflector is dropped by the ship from which measurements are made or by another ship, helicopter or airplane. The sonar 22a of the ship from which measurements are made is used as an acoustic signal source. The effectiveness of the ship's sonar is included. Correct beam shape and geometric spreading is obtained. One way transmission loss $L_0$ when the hydrophone is near the surface, must be subtracted from total transmission loss measured at depth to obtain one way transmission loss at depth.

(b) *Other ship*.—Another ship may be used as the target reflector for the acoustic signal source on the ship from which measurements are made, and the same method of calculation used as mentioned in (2)(a) above. If two ships are abreast of one another on parallel courses, they can increase and decrease the distance separating them (range variation) without covering any appreciable extra distance en route. This is because the hypotenuse of a triangle is only slightly greater than the long leg.

In all of the above methods, the expendable hydrophone probe and related shipboard equipment are the unvarying essential features. The choice lies in the target and source of acoustic signal.

This passive target, if not another ship, must be inexpensive and of accurately known signal strength or target strength (if a reflector). It must remain at sonar depth (15 to 20 ft.) while the ship traverses the range of interest (15 minutes to one hour depending on ship's speed and detection range). Finally, it must sink without a trace when it is no longer needed.

The active pinger 22b, as shown in FIG. 5, may be powered by a sea-water activated battery or other available power source. The frequency emitted should be the same as that of the ship's sonar, in case normal mode propagation or shadow effects are of significance. The expendable hydrophone hard wire link will have a cut-off frequency well below that of the ship's sonar, and will only transmit signal amplitude. Hence, if more than one frequency is used by the ship's sonar and is consequently emitted simultaneously by the pinger, they will not be distinguishable at the shipboard receiver. It is therefore necessary for the pinger to emit only one frequency at a time.

If a reflector target is used, the ship may consecutively try each of its sonar frequencies, tilt angles, pulse duration, repetition rate, etc., to determine the optimum mode for sonar operation. The reflector target will also be less costly, and allows, normal sonar search to continue if desired. Tri-planes are probably inadvisable as reflectors because of the dependence of target strength on orientation. A buoyed, weighted balloon, inflated after launch, can provide a target strength order of magnitude greater than its geometric area. This type of target should be inexpensive and reliable.

The wire currently used has a high frequency cut-off when fully deployed to 1500 ft. depth from a high speed ship. This means the effective signal noise or $S/N$ ratio will deteriorate. There are two ways to improve this situation. A larger diameter, single conductor with seawater return may be utilized, or an electrical by-pass filter may be added following the hydrophone transducer and before the hard wire link. One or both of these approaches may be needed to obtain a useable $S/N$ ratio at the shipboard receiver or recorder. This problem requires detailed analyses and indicates the importance of having a good $S/N$ ratio at the hydrophone. The use of the low frequency acoustic source pinger would produce a good $S/N$ ratio, but might yield misleading results in normal mode propagation and shadow zone penetration.

The noise level at the hydrophone will be due mainly to radiated ship's noise, particularly at higher ship's speeds and will also result from the de-reeling of wire. These noise levels have been measured and documented for various types of ships as a function of ship's speed. For example, a 20 knot destroyer radiates about 0.03 watt per third-octave band over a wide frequency range.

The straight line distance $d$ from the ship to the expendable hydrophone is:

(1) $d = 13t$ yds.

When $t$ is in seconds since launch, hydrophone sink rate is 20 ft./sec. and the ship has a speed of 20 knots. Assuming spherical spreading, but no absorption or refraction of radiated ship's noise, the db loss of ship's noise is:

(2) Noise loss $= 10 \log (13t)^3 = (40 + 30 \log t)$ db $t$ in seconds since hydrophone launch. Thus, the noise loss will vary from 50 db at a hydrophone depth of 100 ft. ($t=5$ seconds) to 87 db at a hydrophone depth of 1500 ft. ($t=75$ seconds).

The use of ship's sonar with a passive reflector provides the advantage of cylindrical spreading of the signal over a one way transmission path, and spherical spreading only on the return path. An even greater $S/N$ advantage is obtained if another ship's sonar is used for the source.

A comparison between a active pinger and a passive reflector may be made in tubular form:

TABLE I.—TARGET COMPARISON

| Passive Reflector | Active Pinger |
| --- | --- |
| (1) Two way transmission loss. | (1) One way transmission loss. |
| (2) Calibrated target strength. | (2) Calibrated source strength. |
| (3) Uses ship's sonar acoustic source. | (3) Requires own acoustic source. |
| (4) Can be used during sonar search. | (4) Cannot be used during sonar search. |
| (5) Measures actual target range by transmission time. | (5) Predict target range by ship's speed; affected by currents, winds. |
| (6) Surface-surface transmission loss must be corrected in received signal. | (6) Received signal does not need correction. |
| (7) Own sonar efficiency included in results. | (7) Own sonar efficiency not not included. |
| (8) Correct beam shape and cylindrical spreading of source. | (8) Incorrect (isotropic) beam shape and spherical spreading of source. |
| (9) Less costly. | (9) More costly. |

All of the items in the above table apply to the case where another ship is used as the active sound source or passive sound source, with the exception of items 8 and 9.

An expendable, active pinger design could be based on existing technology with special emphasis on cost reduction, which should receive major development effort in this type of system. However, correct source beam shape (and cylindrical spreading) would be much more costly.

If a passive reflector is used for a sound source, an inexpensive and effective approach lies in bubble resonance. The effective area for reflection of acoustic energy by a gas bubble in a liquid peaks at a value 100 to 1,000 times the geometric area when the acoustic wave length is the bubble diameter, i.e.: when the bubble is excited by its resonance frequency. The source reflector 22c may comprise one or more balloons which were inflated to the proper diameter and maintained at hull sonor depth below the surface (FIG. 5). The following items would be required in the construction of this type of target:

(1) Balloon with net, weighted at bottom by the weight 26

(2) Small buoy, with pretimed sink mechanism (salt plug)

(3) Carbon dioxide cartridge and trigger for post launch release

When the buoy floods, the entire assembly becomes negatively buoyant and begins to sink, dragging the balloon with it. As it sinks, the external pressure increases, causing the balloon diameter to decrease, which causes a faster rate of descent. Thus the balloon is rapidly sunk and squeezed to a very small volume.

The amplitude of the resonance peak (ratio of effective area to geometric area) will be decreased by lack of sphericity due to vertical pressure gradients in the water over a depth interval equal to the balloon diameter, and due to distortion by the weighted and buoyed net. The actual gain obtained will have to be measured experimentally.

The variation in nominal balloon diameter with variations in depth due to wave effects on the buoy are found as follows:

(3) $$PV = a, \text{ and } V = bD^3 = \frac{a}{p}$$

thus (4) $$D = \frac{c}{p^{1/3}}$$

where:

P = pressure in balloon
D = diameter of balloon (nominal)
V = diameter of balloon (nominal)
$c = (a/b)\ 1/3$, where all are constants, with $$a = RT \text{ and } b + \frac{4}{3}\Pi$$

The standard deviation (D) in D is (5) $$\sigma(D) = \frac{\partial D}{\partial P}\sigma(P) = \frac{c}{3p}\ 4/3\sigma(P)$$

and the coefficient of variation in D (percent in error in D) is (6) $$\frac{\sigma(D)}{D} = -\frac{1}{3}\frac{\sigma(P)}{P}$$

Thus, a 3 ft. depth variation at a balloon center depth of 20 ft. will cause a pressure variation of 1.5 p.s.i. out of an absolute gas pressure of 25 p.s.i. (10 p.s.i. gauge), or 6% error in P, or only 2% error in resonance diameter D.

The preferred mode of operation as shown in FIG. 5 is the use of a passive reflector with the ship's sonar of the ship from which measurements are made. This yields all the information required for accurate range prediction with the exception of submarine aspects (target strength) and sonar operator efficiency (or operator discrimination level). Signal to noise ratio at the hydrophone 18 and at the shipboard equipment 21 (FIG. 2a) (after the attenuation of the hard wire link) must be carefully evaluated.

It is within the scope of this invention to use this system by having a helicopter 24 cooperate with a searching vessel 14 (FIG. 3). In this embodiment, the helicopter deploys the expendable loss hydrophone probe 10 at predetermined points around the searching vessel 14 and transmits resultant intensity versus depth information for varying ranges to said searching ship.

FIG. 3 shows a system variation for measuring shadow zones behind the passive reflector 22c which is submerged in the sea between the active sound source (sonar 22a) and the expended hydrophone probes.

FIG. 1, is a cross-sectional view of an embodiment of the expendable hydrophone probe assembly 10 as used in the system of the present invention. The probe assembly 10 consists of a tail section 10a preferably made of plastic material having an elongated streamlined configuration and being provided with stabilizing fins 10d.

A wire spoon 20a is located inside the tail section. A hard-wire link 20 is wound on the spool 20a and is directed through a top opening 10e when the probe 10 is falling through the water. The tail section is connected to a transducer section 10b, which comprises a tubular ceramic hydrophone 18. The transducer section 10 has the same outside diameter as the bottom diameter of the tail section 10a, and encloses an electronic module 18a.

The transducer section 10b is adjacent a nose section 10c having a semispherical shape and being preferably made of zinc. Since the optimum center of gravity CG of the probe in water is about at a point 25% aft of the nose, the weight of the nose section 10c and the length of the tail section 10a must be adjusted to a definite ratio to move the CG to that desired point. Care must be taken in specifying the outside roughness and dimensional tolerances of respective probe sections.

To decrease self-generated noise of the probe when dropped in the sea or a body of water, the inside of the tail section 10a is acoustically insulated by an insulation layer 27. It has been found that a wound spool 20a with the source impedance would generate a transient DC level due to static electricity as it moves through the ambient atmosphere. By shunting the spool with a resistor of high resistance value and by coating the probe wire 20 with a conductive graphite film 29 (FIGS. 2a and 2b), the self-generated electrical noise is greatly reduced. The tail section is also shielded with conductive silver paint 28 which is electrically connected to the nose section and to the sea water.

The hydrophone output is fed directly into the module 18a, which minimizes any accidental pick-up. The block diagram of the electronic module is shown in FIG. 2a. Sonar transmitter signals may be anywhere from 2 to 10 kc. in frequency and are pulses of only a few milliseconds in duration occurring every second. It is impossible to feed the pulsed AC output of the hydrophone 18, up the standard wire attenuation characteristics at these frequencies.

The electronic module 18a processes the AC signal from the hydrophone to a suitable form for transmission via the hard-wire link 20. Since the system of this invention measures sound pressure at various distances, it is essential to have an AC amplifier capable of handling inputs over a wide range of frequencies and amplitudes. The AC amplifier is operatively coupled with an automatic gain control circuit AGC which derives DC output signals proportional to the magnitude of the sound pressure. These DC signals are amplified in a DC amplifier having a low impedance output and are readily transmitted via the hard-wire link 20. The link 20 is a three-wire cable. Two of the wires are used to power the module (B+, B−=ground); the third wire is used to carry the signal, which is a DC level.

The AGC action is fast, easily detects signals having pulse widths of only 1 millisecond and detects levels from −70 db/ubar to −30 db/ubar.

FIG. 2b schematically shows the indication and recording equipment 21 aboard the searching vessel. The DC signal is fed from a low impedance source into a high impedance input of a signal processing circuit. The shipboard equipment must be modified to record sound intensity vs. depth in terms of signal excess or db loss. This should be done sequentially at each range used with spacing between records proportional to range intervals. Either a strip chart recorder or aperture card plotter may be used.

It is within the scope of the present invention for the signal to originate from a ship or vehicle from which an expendable hydrophone or other suitable device is dropped. Such hydrophone or device may be deployed from the vehicle while the latter is moving at predetermined speeds, while the electrical means connecting said hydrophone or device to the vehicle remains substantially stationary with respect to the water. The electrical means connecting the hydrophone or device to the vehicle may also include means, such as a float 23' (FIG. 4), to enable an alternative method of positioning the hydrophone in the water.

What is claimed is:

1. An expendable transmission loss system for determining the target detection range of sonar apparatus aboard a seagoing vessel, comprising signal means for providing an acoustic signal of determined intensity from a substantially fixed point at sea, a plurality of detecting means in the sea at different determined distances from said signal means for receiving and detecting said acoustic signal, each of said detecting means including means for sinking said detecting means in the sea at a determined rate, indicating means aboard said vessel for indicating the received signals detected by said detecting means, and conducting means electrically connecting each of said detecting means to said indicating means for indicating the intensity of said received signals thereby indicating the transmission loss.

2. An expendable transmission loss system as claimed in claim 1, wherein each of said detecting means comprises an expendable hydrophone device and said signal means comprises a plurality of balloons affixed to a buoy adapted to sink to a determined depth and to remain suspended at said determined depth, said balloons reflecting acoustic signals impinging thereupon.

3. A method of determining the target detection range of sonar apparatus aboard a seagoing vessel by indicating transmission loss of said sonar apparatus, comprising the steps of transmitting an acoustic signal of determined intensity from a substantially fixed point at sea, receiving and detecting said acoustic signal at different determined distances from said fixed point at different depths in the sea varied at a determined rate, and indicating aboard a vehicle the intensity of said received signals thereby indicating the transmission loss.

4. An expendable transmission loss system for determining the target detection range of sonar apparatus, comprising, signal means for providing a signal of predetermined intensity from a substantially fixed point in a fluid, at least one detecting means in said fluid for receiving and detecting said signal, said detecting means including means for varying the disposition of said detecting means at a predetermined rate, indicating means aboard a vehicle for indicating the received signal detected by said detecting means, and conducting means electrically connecting said detecting means to said indicating means for indicating the intensity of said received signal to determine transmission loss.

5. A system according to claim 4, wherein said vehicle is a helicopter.

6. An expendable transmission loss system as claimed in claim 4, wherein said signal means is an active sonic transmitter affixed to a buoy adapted to sink to a determined depth and to remain suspended at said determined depth.

7. An expendable transmission loss system as claimed in claim 4, wherein said signal means comprises a sonar transmitter on a seagoing vessel, a passive sonic reflector affixed to a buoy adapted to sink to a determined depth and to remain suspended at said determined depth, said sonic reflector reflecting sonic signals from said sonar transmitter, and said detecting means is adjusted to sink at a predetermined rate in the sea between said sonic reflector and said sonar transmitter to detect the intensity of reflected signals.

8. An expendable transmission loss system as claimed in claim 4, wherein said indicating means comprises signal processing and recording means for determining the transmission loss as a function of depth and location of the signal source.

References Cited

UNITED STATES PATENTS

| 2,706,285 | 4/1955 | Scott | 340—3 |
| 3,375,487 | 3/1968 | McDaniel et al. | 340—5 |

RICHARD A. FARLEY, Primary Examiner

U.S. Cl. X.R.

340—2